(12) United States Patent
Naito et al.

(10) Patent No.: US 9,940,388 B2
(45) Date of Patent: Apr. 10, 2018

(54) CONTROLLING TRANSMISSION OF INFORMATION GENERATED BASED ON META INFORMATION OF AN EVENT

(71) Applicant: SONY CORPORATION, Tokyo (JP)

(72) Inventors: Yorimitsu Naito, Saitama (JP);
Susumu Nagano, Tokyo (JP);
Kazuhiro Nakagomi, Tokyo (JP);
Takayuki Ochi, Kanagawa (JP);
Takamasa Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 14/824,881

(22) Filed: Aug. 12, 2015

(65) Prior Publication Data

US 2015/0347574 A1   Dec. 3, 2015

Related U.S. Application Data

(63) Continuation of application No. 13/481,197, filed on May 25, 2012, now Pat. No. 9,171,014.

(30) Foreign Application Priority Data

Jun. 13, 2011   (JP) ................. 2011-130962

(51) Int. Cl.
  *G06F 17/30* (2006.01)
  *G06K 9/00* (2006.01)

(52) U.S. Cl.
  CPC .. *G06F 17/30705* (2013.01); *G06F 17/30253* (2013.01); *G06F 17/30265* (2013.01); *G06F 17/30663* (2013.01); *G06F 17/30991* (2013.01); *G06K 9/00288* (2013.01)

(58) Field of Classification Search
  CPC ......... G06F 17/30253; G06F 17/30265; G06F 17/30663; G06F 17/30705; H04L 29/06027
  USPC ........................................... 707/737
  See application file for complete search history.

(56) References Cited

U.S. PATENT DOCUMENTS

| | | | |
|---|---|---|---|
| 2004/0148341 A1* | 7/2004 | Cotte | H04L 29/06027 709/203 |
| 2011/0201317 A1* | 8/2011 | Karandikar | G06Q 30/02 455/414.1 |
| 2015/0347574 A1 | 12/2015 | Naito et al. | |

FOREIGN PATENT DOCUMENTS

| | | |
|---|---|---|
| JP | 2006-235910 A | 9/2006 |
| JP | 2006-338097 A | 12/2006 |
| WO | 2009/131629 A1 | 10/2009 |

OTHER PUBLICATIONS

Japanese office action for Japanese Application No. 2011130962 dated Jul. 21, 2015 with English Translation.

* cited by examiner

*Primary Examiner* — Shahid Alam
(74) *Attorney, Agent, or Firm* — Chip Law Group

(57) ABSTRACT

There is provided an information processing device including an event cluster creation unit configured to create an event cluster including, among a plurality of types of content, reference content serving as a reference and related content, the related content having a different type from the reference content and indicating the same event as the reference content, and a meta information appending unit configured to create meta information about the event on the basis of the event cluster and append the meta information to the event cluster.

31 Claims, 10 Drawing Sheets

FIG. 9
(a) 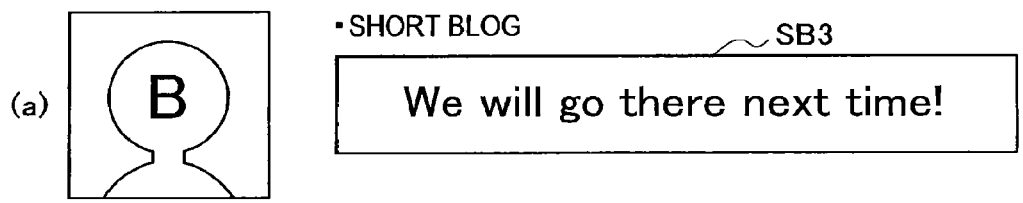
(b) 

CONTROLLING TRANSMISSION OF INFORMATION GENERATED BASED ON META INFORMATION OF AN EVENT

CROSS-REFERENCE TO RELATED APPLICATION

The present application is a continuation of U.S. patent application Ser. No. 13/481,197 filed on May 25, 2012 which claims priority of Japanese Patent Application No. 2011-130962 filed on Jun. 13, 2011 in the Japanese Patent Office, all of which are incorporated herein by reference.

BACKGROUND

The present disclosure relates to an information processing device, an information processing method, a program, and an information processing system.

As shown in JP 2002-344867A, for example, there is known a technique of appending to photo content created by a user location information indicating the location where the photo content was created and subject information indicating the subject of the photo content.

SUMMARY

In the aforementioned technique, however, just location information and subject information are presented in addition to the photo content. Thus, the user has been unable to recall an event when the photo content was created in detail. Thus, a technique that allows a user to recall an event in detail is desired.

According to an embodiment of the present disclosure, there is provided an information processing device including an event cluster creation unit configured to create an event cluster including, among a plurality of types of content, reference content serving as a reference and related content, the related content having a different type from the reference content and indicating the same event as the reference content, and a meta information appending unit configured to create meta information about the event on the basis of the event cluster and append the meta information to the event cluster.

According to another embodiment of the present disclosure, there is provided an information processing method including creating an event cluster including, among a plurality of types of content, reference content serving as a reference and related content, the related content having a different type from the reference content and indicating the same event as the reference content, and creating meta information about the event on the basis of the event cluster and appending the meta information to the event cluster.

According to still another embodiment of the present disclosure, there is provided a program for causing a computer to implement an event cluster creation function for creating an event cluster including, among a plurality of types of content, reference content serving as a reference and related content, the related content having a different type from the reference content and indicating the same event as the reference content, and a meta information appending function for creating meta information about the event on the basis of the event cluster and appending the meta information to the event cluster.

According to yet another embodiment of the present disclosure, there is provided an information processing system including a server including an event cluster creation unit configured to create an event cluster including, among a plurality of types of content, reference content serving as a reference and related content, the related content having a different type from the reference content and indicating the same event as the reference content, a meta information appending unit configured to create meta information about the event on the basis of the event cluster and append the meta information to the event cluster, and a communication unit configured to transmit the event cluster with the meta information appended thereto, and a user terminal configured to present the event cluster transmitted from the server to a user.

According to the present disclosure, it is possible to create an event cluster including a plurality of types of content related to the same event and meta information related to the event, and present them to a user.

According to the embodiments of the present disclosure described above, as a user can collectively check a plurality of types of content, the user can recall an event in detail.

BRIEF DESCRIPTION OF THE DRAWINGS

FIG. 9 is an explanatory diagram showing content created by another user for the same content;

DETAILED DESCRIPTION OF THE EMBODIMENTS

Figure 1:
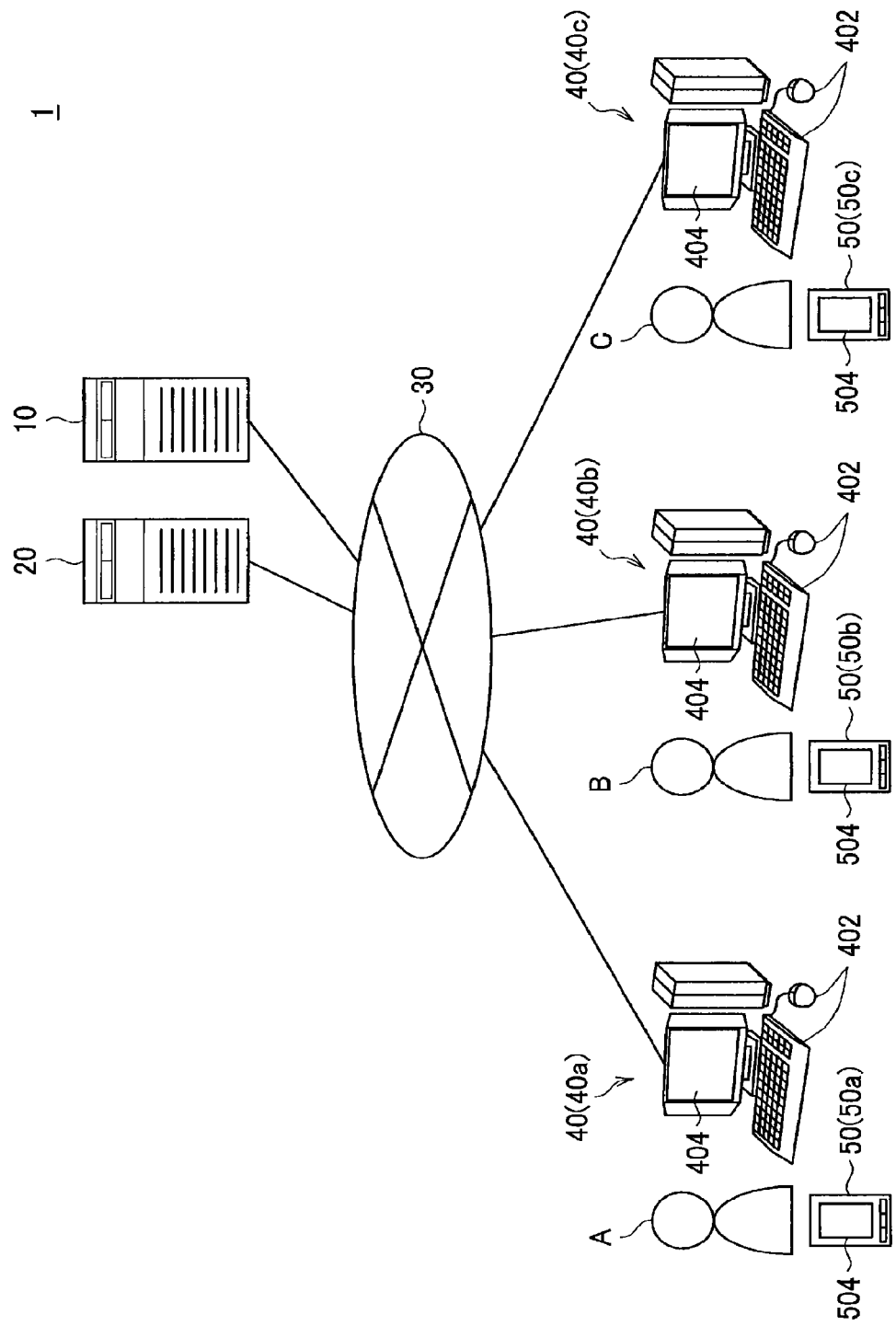
FIG. 1 is an explanatory diagram showing an information processing system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Study on Related Art
2. Configuration of Information Processing System
   2-1. Overall Configuration
   2-2. Configuration of Event Automatic Creation Server
   2-3. Configuration of User Terminal 3. Procedures of Information Processing System <1. Study on Related Art>

The inventors have conducted concentrated studies on the art related to the present disclosure, and consequently developed an information processing system related to the present disclosure. Thus, studies conducted by the inventors will be described first.

When a user experiences some event, he/she creates and uploads content using various types of web services to record a memory of the event. Examples of such web services include a photo content management service and a social networking service.

That is, a user uploads photo content to a server using a photo content management server. Alternatively, a user, using a social networking service, creates various types of social content and uploads them to a server. Social content is content other than photo content among pieces of content that are provided on a social networking service. Examples of social content include albums, blogs, short blogs, tags, chat, mails, event calendars, contact information, and user profiles. An album is a collection of a plurality of pieces of photo content indicating the same event. That is, in this embodiment, an album is handled as social content. An event calendar is data in which an event generation place, event information, and event participants (e.g., attendees or participants) and the like are recorded for each date. Contact information is information disclosed on the social network, and is information needed to contact (access) a user of the social network (e.g., user ID or various addresses). A user profile includes the name, sex, birthday, postal address, family make-up, hobby, belonging organization, and the like of the user.

A user views content and shares the content with other users using a web service. However, so far, users have been able to view only a single type of content on each web service. For example, users have been able to view only photo content on a photo management service. Meanwhile, users have been able to view only blogs on a blog-related social networking service. That is, in the past web services, even when a user creates a plurality of types of content for the same event, such plurality pieces of content are dispersed.

Meanwhile, a user has been unable to, only by viewing a single type of content, fully recall an event related to the content. For example, a user has been unable to, only by viewing photo content (or a slide show in which photo content switches with time), recall what feeling he/she had or what type of conversation he/she had with his/her friend when participating in the event. Thus, in the past web services, users have been unable to recall an event in detail.

As a method for allowing a user to recall an event in detail, collecting dispersed pieces of content by the user is considered, for example. In this method, however, the user should perform a manual operation to recall the event in detail. In particular, as meta information appended to each content, namely, information that becomes a key for collection is not always common, quite a large amount of labor would be needed for the user operation. Thus, as the user should recall an event in detail in this method, a large amount of labor would be needed.

In addition, as described above, meta information appended to each content is not always common. Further, meta information appended to each content is not the one in which the whole event is taken into consideration. Therefore, with the past web services, a user has been unable to promptly recall a summary of an event only by viewing meta information.

Note that there is known a service that classifies a plurality of pieces of photo content on the basis of the creation time and creation place of the photo content. With this service, however, a user has been able to view only photo content. Therefore, the user should, in order to recall an event in detail, collect content other than the photo content, such as social content, through a manual operation.

There is also known a service that associates a subject of (a character in) photo content with a user on a social network. With this service, however, a user has been able to view only photo content. Therefore, the user should, in order to recall an event in detail, collect content other than the photo content, such as social content, through a manual operation.

There is also known a service that concurrently displays a plurality of types of content. However, this service does not at all take the relevance of each content into consideration. That is, a plurality of pieces of content related to the same event are dispersed. Thus, in this service also, the user should, in order to recall an event in detail, collect the dispersed content through a manual operation.

Meanwhile, as described above, JP 2002-344867A discloses a technique of appending to photo content created by a user location information indicating a location where the photo content was created and subject information indicating the subject of the photo content. This technique, however, does not at all take into consideration content other than the photo content, such as social content. Thus, the user should, in order to recall an event in detail, collect content other than the photo content, such as social content, through a manual operation.

JP 2008-207451A discloses a technique of appending to each content weight information in accordance with the importance of a memory. This technique, however, does not at all take into consideration content other than photo content, such as social content. Thus, the user should, in order to recall an event in detail, collect content other than the photo content, such as social content, through a manual operation.

JP 2010-148056A discloses a technique of presenting a plurality of types of content on the basis of a history of user operations. However, this technique only presents a plurality of types of content on the basis of a history of user operations, and the plurality of pieces of the displayed content do not indicate the same event. Thus, in this technique also, the user should, in order to recall an event in detail, collet the dispersed content through a manual operation.

JP 2010-193265A discloses a technique of creating schedule data on the basis of photo content. However, in this technique also, content other than the photo content, such as social content, is not taken into consideration at all. Thus, in this technique also, the user should, in order to recall an event in detail, collet the dispersed content through a manual operation.

JP 2010-218371A discloses a technique of supporting tagging to photo content. However, in this technique also, content other than the photo content, such as social content, is not taken into consideration at all. Thus, in this technique also, the user should, in order to recall an event in detail, collet the dispersed content through a manual operation.

In contrast to each of the aforementioned techniques, with an information processing system 1 in accordance with the present disclosure, a user can promptly recall a summary of an event. Further, the user can easily recall the details of an event. Hereinafter, the information processing system 1 will be described in detail.

<2. Configuration of Information Processing System>
[2-1. Overall Configuration]

First, the overall configuration of the information processing system 1 will be described. The information processing system 1 includes an event automatic creation server 10, a service providing server 20, a network 30, and user terminals 40 and 50.

The event automatic creation server 10 acquires a plurality of types of content from the content providing server 20, and gathers, among the acquired content, content related to the same event to create an event cluster. Further, the event automatic creation server 10, on the basis of the event cluster, creates meta information about the event, and appends the meta information to the event cluster. The event automatic creation server 10 transmits the thus created event cluster to the user terminal 40.

The service providing server 20 provides various web services such as, for example, a photo content management service and a social networking service. Specifically, the service providing server 20 stores photo content and social content uploaded by the user terminals 40 and 50, for example. The service providing server 20 transmits such content to the user terminals 40 and 50. Note that in this embodiment, content stored in the service providing server 20 has appended thereto, as meta information, user information indicating a user who has created the content, creation time information indicating the creation time of the content, and creation place information indicating the creation place of the content. Such creation time information and creation place information are, for example, in an EXIF file format.

The network 30 mutually connects the event automatic creation server 10, the service providing server 20, and the user terminals 40 and 50. The user terminals 40 and 50 create, upload, or display various types of content, for example. The user terminal 40 is a so-called stationary personal computer, and the user terminal 50 is a so-called smartphone. A user A has user terminals 40a and 50a, a user B has user terminals 40b and 50b, and a user C has user terminals 40c and 50c.

Note that the user terminals are not limited to the aforementioned examples, and may be television receivers, car navigation systems, game machines, music players, portable phones other than smartphones, digital cameras, or smart tablets. In addition, the number of each of the event automatic creation server 10, the service providing server 20, and the user terminals 40 and 50 is not limited to that shown in FIG. 1.

[2-2. Configuration of Event Automatic Creation Server]

Figure 2:
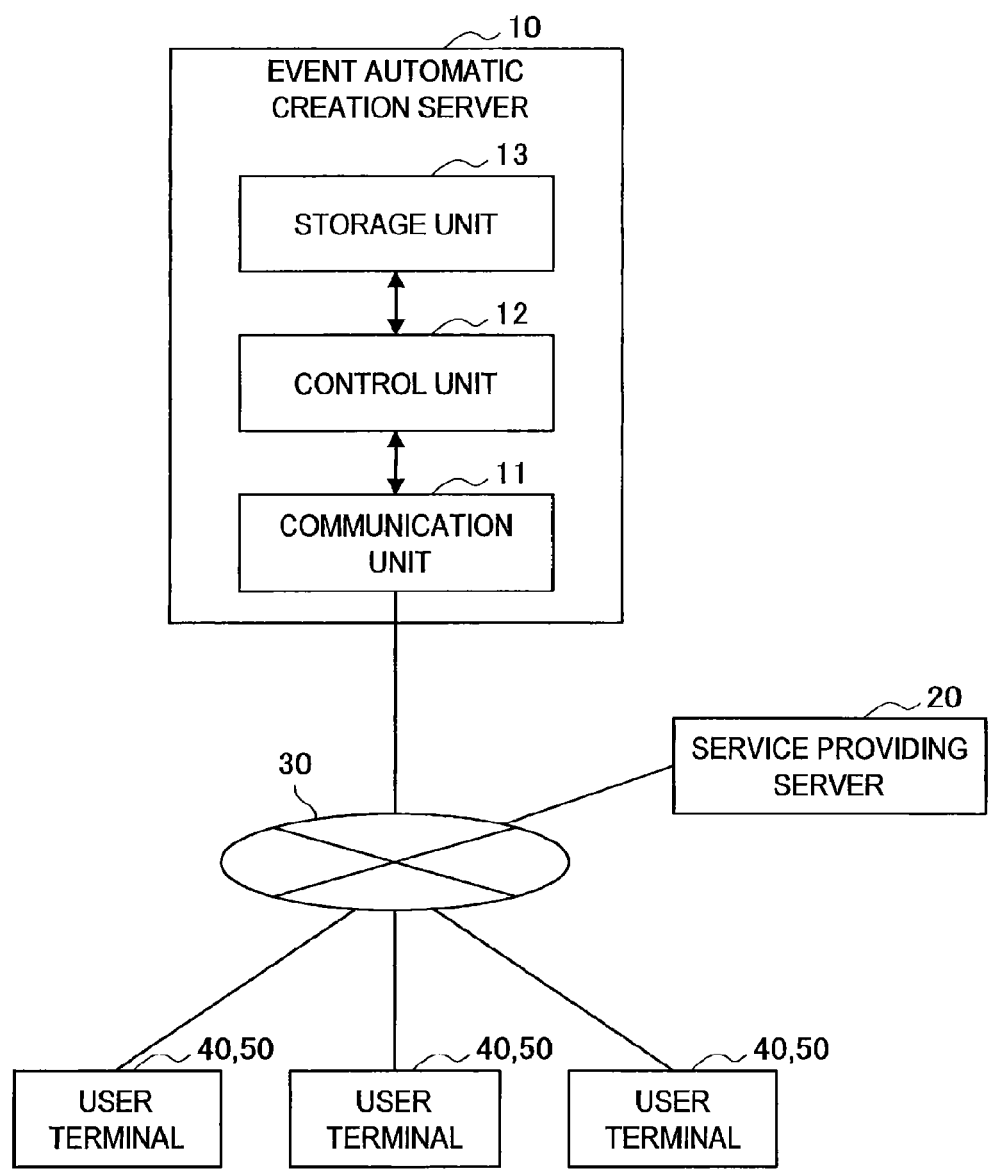
FIG. 2 is a block diagram showing a server configuration in accordance with the embodiment.
Figure 3:
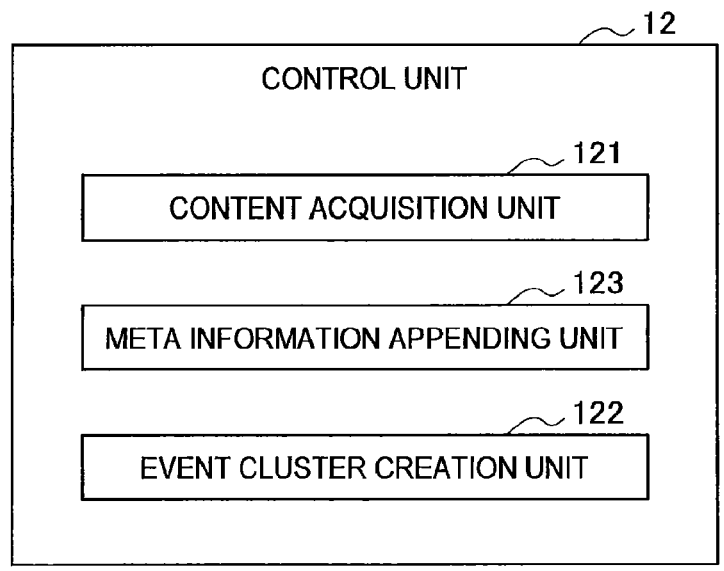
FIG. 3 is a block diagram showing the configuration of a control unit.
Figure 4:
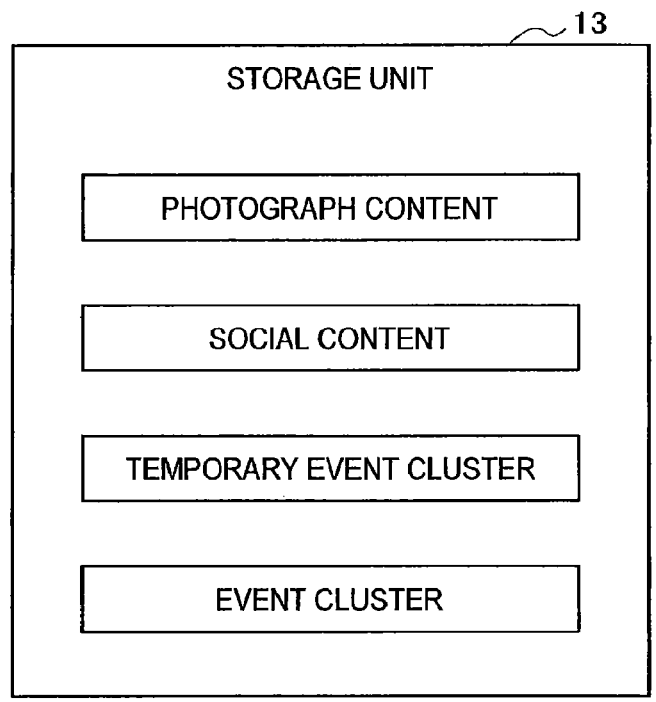
FIG. 4 is a block diagram showing the configuration of a storage unit.

Next, the configuration of the event automatic creation server 10 will be described with reference to FIGS. 2 to 4. The event automatic creation server 10 includes a communication unit 11, a control unit 12, and a storage unit 13.

The communication unit 11 communicates with the service providing server 20 and the user terminals 40 and 50 via the network 30. The control unit 12 includes, as shown in FIG. 3, a content acquisition unit 121, an event cluster creation unit 122, and a meta information appending unit 123. The storage unit 13 stores, as shown in FIG. 4, programs and the like that are necessary for processes of the event automatic creation server 10, photo content, social content, a temporary event cluster, and an event cluster. In addition, the storage unit 13 also stores a face image correspondence table. This face image correspondence table is a table in which face images and human information (e.g., names, nicknames, or user IDs on various social networks) about humans having the face images are recorded.

The content acquisition unit 121 acquires photo content and social content from the service providing server 20 via the communication unit 11. Examples of the social content acquired by the content acquisition unit 121 include albums, blogs, short blogs, chat, mails, event calendars, contact information, and user profiles. An event calendar is data in which an event and event participants (e.g., attendees or participants) like are recorded for each date. The user profile includes the name, birthday, family make-up, address of the parents' home, hobby, belonging organization, and the like of the user. The content acquisition unit 121 stores the acquired photo content and social content into the storage unit 13. The content acquisition unit 121 may acquire content from the user terminals 40 and 50.

The event cluster creation unit 122 creates an event cluster including reference content and related content that has a different type from the reference content but indicates the same event as the reference content. Specifically, the event cluster creation unit 122 acquires from the storage unit 13 photo content created by a given user (hereinafter referred to as a "reference user") as reference content.

Then, the event cluster creation unit 122 gathers photo content whose creation times and creation places are close to create a temporary event cluster. Herein, for example, the event cluster creation unit 122, if the difference between the creation times is within one hour, determines that the creation times are close, and if the difference between the creation places is within 1 km, determines that the creation places are close. The event cluster creation unit 122 calculates the creation time of the temporary event cluster by averaging the creation times of the photo content that constitute the temporary event cluster. Further, the event cluster creation unit 122 designates the center of gravity (calculated average value) of the creation places of the photo content that constitute the temporary event cluster as a creation place of the temporary event cluster. The event cluster creation unit 122 appends as the meta information the creation time information and the creation place information of the temporary event cluster to the temporary event cluster.

Further, the event cluster creation unit 122 recognizes a face image in the temporary event cluster by performing a face image recognition process on the temporary event cluster. Then, the event cluster creation unit 122 recognizes face images that are similar as a face image of one person. The event cluster creation unit 122 identifies a human in the temporary event cluster on the basis of the recognized face image and the face image correspondence table. The event cluster creation unit 122 appends as the meta information of the temporary event cluster human information about the identified human to the temporary event cluster. After that, the event cluster creation unit 122 stores the temporary event cluster into the storage unit 13.

Further, the event cluster creation unit 122 acquires a temporary event cluster including photo content created by the reference user. The event cluster creation unit 122 acquires from the storage unit 13 social content created by the reference user and a related user who is related to the reference user (e.g., a user in a friend relationship on a social network).

The event cluster creation unit 122 designates social content indicating the same event as the temporary event cluster as the related content, and associates the social content with the temporary event cluster. Then, the event cluster creation unit 122 gathers the content that are associated with each other into a single event cluster. Accordingly, the event cluster creation unit 122 creates an event cluster including the temporary event cluster and the social content that are related to the same event.

Specifically, the event cluster creation unit 122, if the creation times of the temporary event cluster and the social content are close, associates them with each other. For example, the event cluster creation unit 122, if the difference between the creation times is within one hour, determines that the creation times are close.

The event cluster creation unit 122 associates a temporary event cluster with an album having the same photo content as the temporary event cluster. This is because an album is a collection of photo content related to a single event. Accordingly, there is a case in which a plurality of temporary event clusters are associated with a single album. That is, a collection of photo content is corrected by social content.

Further, the event cluster creation unit 122 performs morphological analysis on social content including text information to extract words from the text information. Then, the event cluster creation unit 122, if the extracted words include a word related to a period, designates the period as an event generation period.

Meanwhile, the event cluster creation unit 12, if the extracted words include a word related to a place, designates the place as an event generation place. The event cluster creation unit 122, if the event generation period includes the creation time of the temporary event cluster and the event generation place is close to the creation place of the temporary event cluster, associates the social content with the temporary event cluster. This is because, when such conditions are satisfied, there is quite a high possibility that the social content and the temporary event cluster indicate the same event. Herein, the event cluster creation unit 122, if the difference between the event generation place and the creation place of the temporary event cluster is within 1 km, determines that the event generation place is close to the creation place of the temporary event cluster.

The event cluster creation unit 122, if the social content includes photo content (for example, if the social content is a blog including photo content), associates the social content with a temporary event cluster including the photo content. This is because, when such conditions are satisfied, there is quite a high possibility that the social content and the temporary event cluster indicate the same event.

Besides, the event cluster creation unit 122 performs the following association in accordance with the type of the social content. That is, the event cluster creation unit 122, if the date of an event calendar includes the creation time of the temporary event cluster, and the event generation place in the event calendar and the creation place of the temporary event cluster are close, associates them with each other. This is because, when such conditions are satisfied, there is quite a high possibility that an event calendar that is the social content and the temporary event cluster indicate the same event.

In addition, the event cluster creation unit 122, if a user profile matches human information of the temporary event cluster, associates them with each other. Likewise, the event cluster creation unit 122, if contact information matches human information of the temporary event cluster, associates them with each other. The event cluster creation unit 122 stores the created event cluster into the storage unit 13.

The meta information appending unit 123 acquires an event cluster from the storage unit 13, and creates meta information related to an event on the basis of the event cluster (i.e., a temporary event cluster and social content included in the event cluster). The meta information appending unit 123 appends the created meta information to the event cluster. The meta information appending unit 123 stores the event cluster with the meta information appended thereto into the storage unit 13. Specifically, the meta information appending unit 123 performs the following process.

The meta information appending unit 123 performs morphological analysis on social content including text information to extract words from the text information. Then, the meta information appending unit 123, if the extracted words include candidate words for an event title, designates a word with the highest priority as the event title. Herein, examples of the candidate words for the event title include an event name (e.g., "cherry blossom viewing," "fire works," "birth day," "birth," or "wedding"), a facility name (e.g., the name of a theme park), and a human name. The priority order is as follows, for example: event name>facility name>human name. Then, the meta information appending unit 123 appends as the meta information event title information related to the event title to the event cluster.

The meta information appending unit 123, if the extracted words include a word related to a period, designates the period as the event generation period. Note that the meta information appending unit 123 may designate, among the times at which photo content were created, a period from the earliest time to the latest time as the event generation period. The meta information appending unit 123 may, if the creation times of social content are concentrated at a specific period (if the number of pieces of social content per unit time is greater than or equal to a predetermined number), designate the period as the event generation period. The meta information appending unit 123 appends as the meta information event generation period information about the event generation period to the event cluster.

The meta information appending unit 123, if the extracted words include a word related to a place, designates the place as the event generation place. Examples of such word include a word that can directly identify a place such as an address, and a word that can indirectly identify a place such as a facility name. Note that the meta information appending unit 123 may designate the creation place of the temporary event cluster as the event generation place. The meta information appending unit 123 appends as the meta information event generation place information about the event generation place to the event cluster.

The meta information appending unit 123, if the same person is included in a predetermined number of or more pieces of photo content, determines the photo content including the person as event representative content. This is because, there is a high possibility that such photo content includes the most exciting scene in the event. The meta information appending unit 123 may, if the event title is a person's name, determine photo content including the person as the event representative content. Then, the meta information appending unit 123 appends as the meta information event representative content information, which designates the event representative content, to the event cluster.

The meta information appending unit 123, if the same person is included in a predetermined number of or more pieces of photo content, designates the person as a main character of the event. Note that the meta information appending unit 123 may, if the same person's name is extracted a predetermined number of times or more when morphological analysis is performed on text information, determine the person as a main character of the event. Alternatively, the meta information appending unit 123 may, if the event title is a person's name, determine the person as a main character of the event. Then, the meta information appending unit 123 appends as the meta information event main-character information about the main character of the event to the event cluster.

The meta information appending unit 123, on the basis of the temporary event cluster, the social content, the event title information, the event generation period information, the event generation place information, and the event main-character information, creates event attribute information indicating the event attributes. The meta information appending unit 123 appends the event attribute information as the meta information to the event cluster.

For example, the meta information appending unit 123, if the event generation period is longer than one day, the event generation place is outside of home, and the social content includes a word representing a "trip," "place name," or "landmark name," determines the event attributes to be a "trip." The meta information appending unit 123 appends the event attribute information indicating a "trip" as the meta information to the event cluster.

The meta information appending unit 123, if the event generation period is less than or equal to one day, the event generation place is outside of home, and the social content includes a word representing "recreation," "land name, or "landmark name," determines the event attributes to be "recreation." The meta information appending unit 123 appends the event attribute information indicating "recreation" as the meta information to the event cluster.

The meta information appending unit 123, on the basis of the event main-character information and the user profile of the main character of the event, recognizes the birthday of the main character of the event. Then, the meta information appending unit 123, if the birthday of the main character of the event is included in the event generation period and predetermined periods (e.g., one or two days) before and after that, determines the event attributes to be "birthday." The meta information appending unit 123 may, when social content includes a word representing "birthday" or "age," determines the event attributes to be "birthday." The meta information appending unit 123 appends the event attribute information indicating "birthday" as the meta information to the event cluster.

The meta information appending unit 123, on the basis of the event main-character information and the user profile of the main character of the event, recognizes the parents' home of the main character of the event. Then, the meta information appending unit 123, if the event generation place is the parents' home of the main character of the event, determines the event attributes to be "homecoming visit." Then, the meta information appending unit 123 appends the event attribute information indicating "homecoming visit" as the meta information to the event cluster.

The meta information appending unit 123, if the sex of the main character of the event differs from the sex of the reference user, determines the event attributes to be "dating." Then, the meta information appending unit 123 appends the event attribute information indicating "dating" as the meta information to the event cluster.

The meta information appending unit 123, if the social content includes a word indicating "eating," determines the event attributes to be "eating." The meta information appending unit 123 appends the event attribute information indicating "eating" as the meta information to the event cluster.

The meta information appending unit 123, when the following conditions are satisfied: the event generation period matches an entrance ceremony season and the age of the main character of the event matches the age of entrance into each school, determines the event attributes to be "entrance into school." The age of the main character of the event is determined on the basis of the user profile of the main character of the event. The meta information appending unit 123 may, if the social content includes a word indicating "entrance into school" or "entrance into kindergarten," determine the event attributes to be "entrance into school." The meta information appending unit 123 appends the event attribute information indicating "entrance into school" as the meta information to the event cluster.

The meta information appending unit 123, when the following conditions are satisfied: the event generation period matches a graduation ceremony season and the age of the main character of the event matches the age of graduation from each school, determines the event attributes to be "graduation from school." The meta information appending unit 123 may, if the social content includes a word indicating "graduation from school" or "graduation from kindergarten," determine the event attributes to be "graduation from school." The meta information appending unit 123 appends the event attribute information indicating "graduation from school" as the meta information to the event cluster.

The meta information appending unit 123 grasps the hobby of the reference user on the basis of the user profile of the reference user. Then, the meta information appending unit 123, if the social content includes a word related to the hobby of the reference user, determines the event attributes to be "hobby." The meta information appending unit 123 appends the event attribute information indicating "hobby" as the meta information to the event cluster.

The meta information appending unit 123 grasps the name of a child of the reference user on the basis of the user profile of the reference user. Then, the meta information appending unit 123, if the social content includes a word related to the name of the child of the reference user or an event for children (e.g., "sports day" or "Shichi-go-san (a traditional Japanese festival for 3-year-old boys and girls, 5-year-old boys, and 7-year-old girls)"), determines the event attributes to be "events for children." The meta information appending unit 123 appends the event attribute information indicating "events for children" as the meta information to the event cluster.

The meta information appending unit 123, if the event generation period includes some anniversary (e.g., Father's Day, Mother's Day, or a wedding anniversary of the reference user), determines the event attributes to be "anniversary." Note that the wedding anniversary of the reference user is determined on the basis of the user profile, for example. The meta information appending unit 123 may, if the social content includes a word related to "anniversary," determine the event attributes to be "anniversary." The meta information appending unit 123 appends the event attribute information indicating "anniversary" as the meta information to the event cluster.

The meta information appending unit 123 determines the event attributes other than those described above to be a "daily event." The meta information appending unit 123 appends event attribute information indicating a "daily event" as the meta information to the event cluster.

Note that the event attribute determination process of the meta information appending unit 123 may be performed either in accordance with a program or a template that has been prepared in advance. The template is adapted to record a temporary event cluster, social content, event title information, event generation period information, event generation place information, and event main-character information and event attributes in association with each other.

In addition, the meta information appending unit 123 associates event clusters that are similar with each other. Determination if the event clusters are similar is performed on the basis of, for example, commonality of event titles, commonality of the event generation places, commonality of the main characters of the events, or commonality of memories.

Specifically, the meta information appending unit 123, if the event titles are the same, determines that the event clusters are similar. The meta information appending unit 123, if the event generation places are close, determines that the event clusters are similar. The meta information appending unit 123, if the main characters of the events are the same, determines that the event clusters are similar. The meta information appending unit 123, if each event cluster includes a word indicating the same feeling (e.g., "freaked," "fun," "bored," or "laughing"), determines that the event clusters are similar. Then, the meta information appending unit 123 appends link information for linking to the mutually similar event cluster as the meta information to the event cluster. This link information includes, for example, address information of the event cluster and thumbnail image information indicating the event cluster.

[2-3. Configuration of User Terminal]

Figure 5:
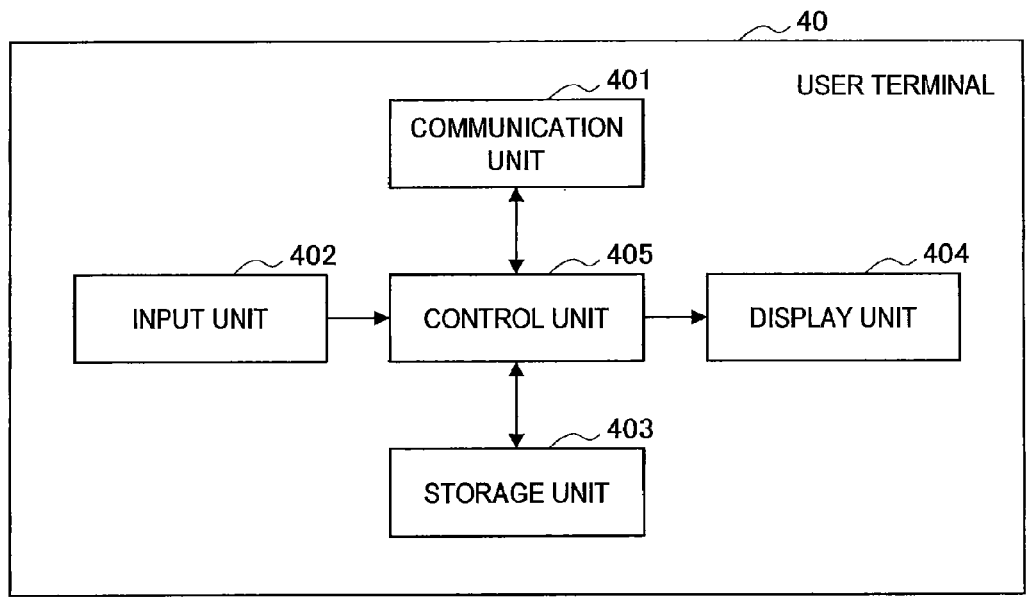
FIG. 5 is a block diagram showing the configuration of a user terminal.

Next, the configurations of the user terminals 40 and 50 will be described with reference to FIGS. 5 and 6. The user terminal 40 includes a communication unit 401, an input unit 402, a storage unit 403, a display unit 404, and a control unit 405.

The communication unit 401 communicates with the event automatic creation server 10, the service providing server 20, and the other user terminals 40 and 50 via the network 30. The input unit 402 is, for example, a keyboard and a mouse, and outputs operation information in accordance with a user operation to the control unit 405. The storage unit 403 stores information necessary for processes of the control unit 405, for example, programs. The display unit 404 is a so-called display, and displays various information. The control unit 405 controls each component of the user terminal 40.

Each user can generate photo content or social content using his/her own user terminal 40 and upload the content to the service providing server 20. For example, the user inputs social content to the user terminal 40 using the input unit 402. In addition, the user inputs photo content or social content in the user terminal 50 to the user terminal 40 by connecting the user terminal 50 to the user terminal 40. The control unit 405 appends user information, creation time information, and creation place information to the input content, and outputs the content to the communication unit 401. The communication unit 401 transmits the content to the service providing server 20. The service providing server 20 stores the received content for each user.

Figure 6:
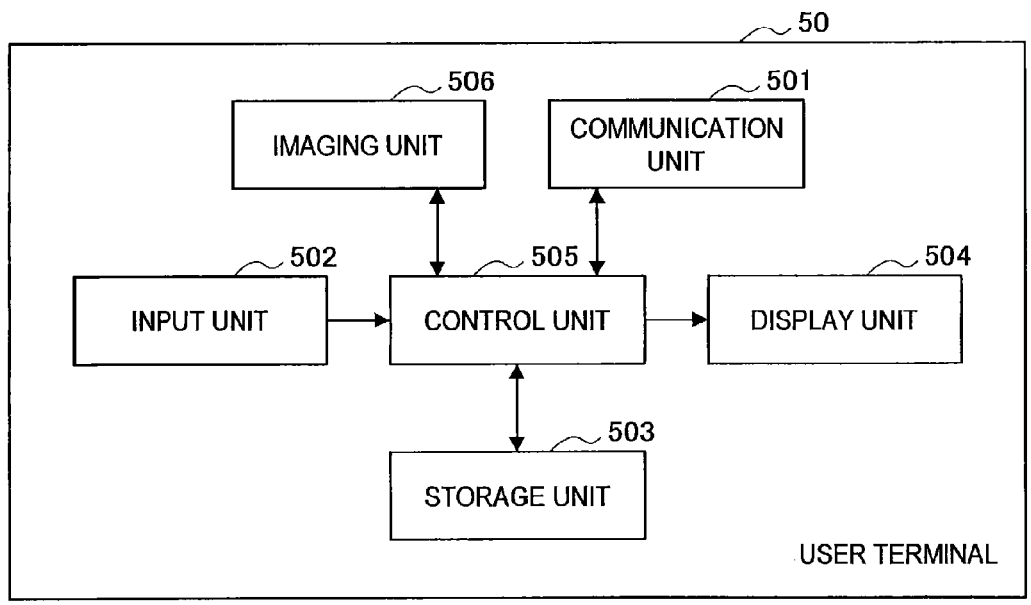
FIG. 6 is a block diagram showing the configuration of a user terminal.

The user terminal 50 includes, as shown in FIG. 6, a control unit 501, an input unit 502, a storage unit 503, a display unit 504, an imaging unit 505, and a control unit 506.

The communication unit 501 communicates with the event automatic creation server 10, the service providing server 20, and the other user terminals 40 and 50 via the network 30. The input unit 502 is, for example, a touch pad, and outputs operation information in accordance with a user operation to the control unit 505. The storage unit 503 stores information necessary for processes of the control unit 505, for example, programs. The display unit 504 is a so-called display, and displays various information. The imaging unit 505, by capturing an image around the user terminal 50, creates photo content and stores the content into the storage unit 503. The control unit 505 controls each component of the user terminal 50.

Each user can generate photo content or social content using his/her own user terminal 50 and upload the content to the service providing server 20. For example, the user inputs social content to the user terminal 50 using the input unit 502. In addition, the user creates photo content using the imaging unit 505. The control unit 505 appends user information, creation time information, and creation place information to the input (created) content, and outputs the content to the communication unit 501. The communication unit 501 transmits the content to the service providing server 20. The service providing server 20 stores the received content for each user.

<3. Procedures of Process of Information Processing System>

Figure 7:
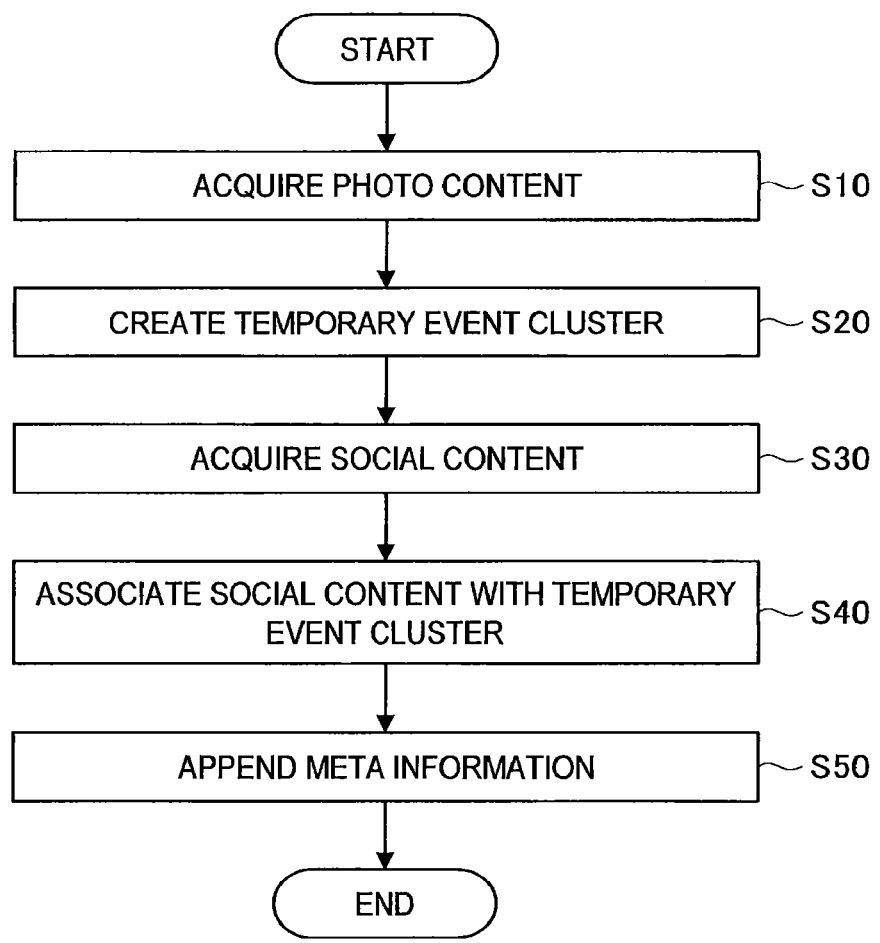
FIG. 7 is a flowchart showing the procedures of a process performed by an information processing system.
Figure 8:
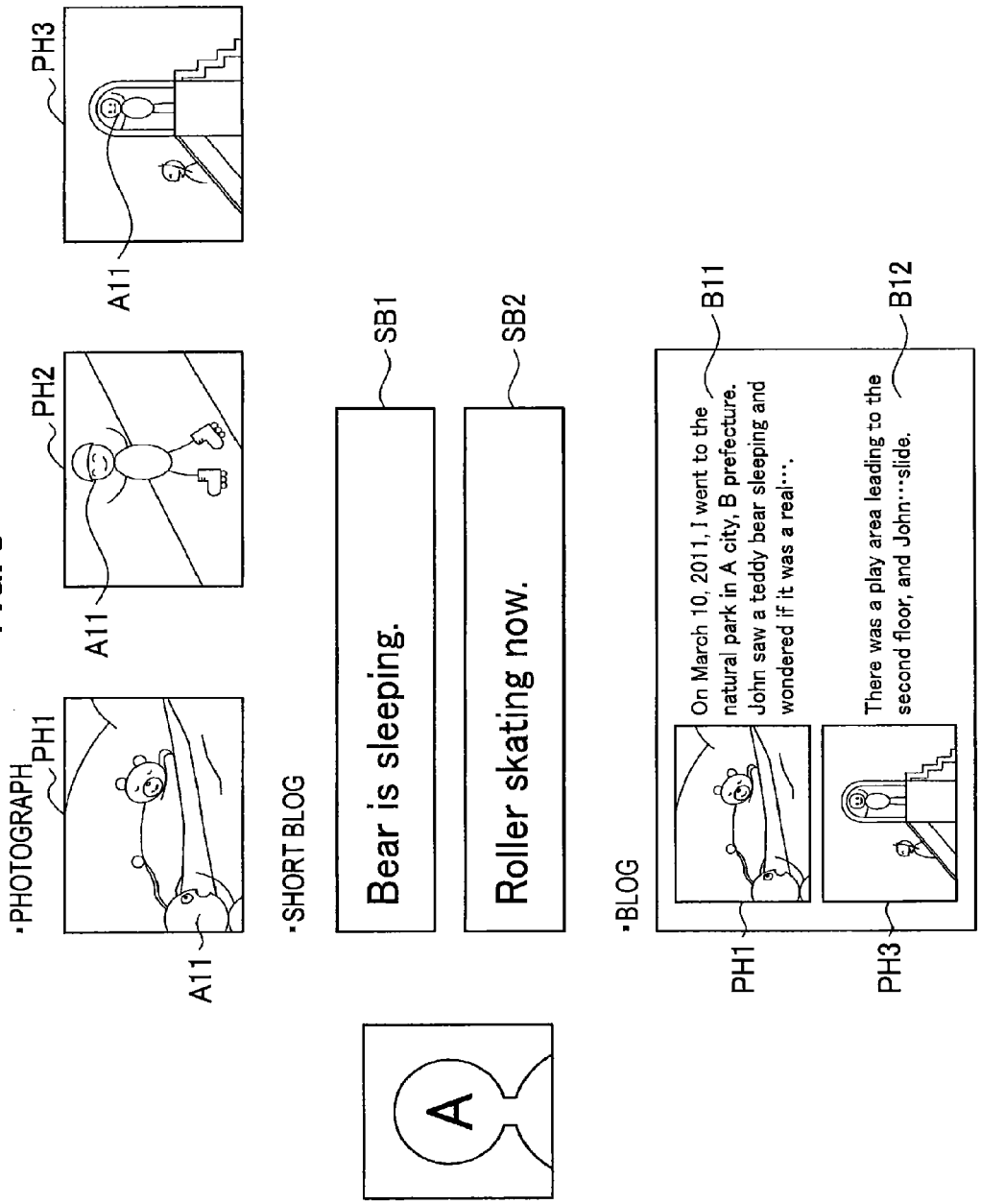
FIG. 8 is an explanatory diagram showing content created by a given user for a given event.

Next, the procedures of a process of the information processing system 1 will be described on the basis of FIG. 7. Herein, procedures of a process of the information processing system 1 will be described with reference to an example in which users A to C have created photo content and social content shown in FIGS. 8 to 9.

That is, in this example, the user A went out to a natural park in A city, B prefecture with his/her family, and created photo content PH1 to PH3 and short blogs SB1 to SB2 at the natural park. Then, the user A created a blog B1 after getting back home in that day. In the blog B1, the photo content PH1 and text information B11 are associated with each other, and the photo content PH3 and text information B12 are associated with each other.

Users B and C are in a friend relationship with the user A. As shown in FIG. 9, the user B created a short blog SB3 and the user C created a short blog SB4. The photo content PH1 and the short blogs SB1, SB3, and SB4 are close in terms of the creation time. Likewise, the photo content PH2 and the short blog SB2 are close in terms of the creation time.

Such content is stored in the service providing server 20. In addition, in a face image correspondence table, a face image of the person A11 is associated with "John" that is a nickname of the person A11.

In step S10, the content acquisition unit 121 acquires photo content and social content from the service providing server 20. The content acquisition unit 121 stores the acquired photo content and social content into the storage unit 13. Content acquired by the content acquisition unit 121 includes the photo content PH1 to PH3, the short blogs SB1 to SB4, and the blog B1.

In step S20, the event cluster creation unit 122 designates the user A as a reference user, and acquires the photo content PH1 to PH3 created by the user A as reference content. Note that the event cluster creation unit 122 may designate another user as a reference user.

The event cluster creation unit 122 gathers, among the photo content PH1 to PH3, photo content whose creation times and creation places are close, to create a temporary event cluster. In this example, the event cluster creation unit 122 determines that the creation times of the photo content PH1 to PH3 are different. Then, the event cluster creation unit 122 creates a temporary event cluster to which only the photo content PH1 belongs (hereinafter also referred to as a "temporary event cluster PH1"). Likewise, the event cluster creation unit 122 creates a temporary event cluster to which only the photo content PH2 belongs (hereinafter also referred to as a "temporary event cluster PH2"). Further, the event cluster creation unit 122 creates a temporary event cluster to which only the photo content PH3 belongs (hereinafter also referred to as the "temporary event cluster PH3"). Further, the event cluster creation unit 122 calculates the creation places and the creation times of the temporary event clusters PH1 to PH3. In this example, the creation places and the creation times of the photo content PH1 to PH3 become the creation places and the creation times of the temporary event clusters PH1 to PH3 as they are. The event cluster creation unit 122 appends as the meta information the creation places and the creation times of the temporary event clusters to the temporary event clusters PH1 to PH3, respectively.

Further, the event cluster creation unit 122 performs a face image recognition process on the temporary event clusters PH1 to PH3 to recognize face images in the temporary event clusters PH1 to PH3. Then, the event cluster creation unit 122 recognizes face images that are similar as a face image of one person. In this example, as the photo content PH1 to P113 include the person A11, the event cluster creation unit 122 recognizes the face image of the person A11.

Then, the event cluster creation unit 122, on the basis of the recognized face image and the face image correspondence table, identifies the person A11 in the temporary event cluster as "John." The event cluster creation unit 122 appends as the meta information of the temporary event cluster person information about the identified person to the temporary event cluster. After that, the event cluster creation unit 122 stores the temporary event cluster into the storage unit 13.

In step S30, the event cluster creation unit 122 acquires the temporary event clusters including the photo content PH1 to PH3 created by the user, namely, the temporary event clusters PH1 to PH3. The event cluster unit 122 acquires social content created by the users A to C, namely, the short blogs SB1 to SB4 and the blog B1.

In step S40, the event cluster creation unit 122 designates the social content indicating the same event as the temporary event clusters PH1 to PH3 as related content, and associates the social content with the temporary event clusters PH1 to PH3.

Specifically, the event cluster creation unit 122, if the creation times of the temporary event clusters PH1 to PH3 and the social content are close, associates them with each other. In this example, the event cluster creation unit 122 associates the temporary event cluster PH1 with the short blogs SB1, SB3, and SB4. Likewise, the event cluster creation unit 122 associates the temporary event cluster P112 with the short blog SB2.

Further, the event cluster creation unit 122, by performing morphological analysis on social content including text information, namely, the short blogs SB1 to SB4 and the blog B1, extracts words from the text information. Then, the event cluster creation unit 122, if the extracted words include a word related to a period, designates the period as the event generation period. In this example, the text information B11 includes a word "Mar. 10, 2011" indicating a period. Thus, the event cluster creation unit 122 determines "Mar. 10, 2011" to be the event generation period.

In addition, the event cluster creation unit 122, when the extracted words include a word related to a place, designates the place as the event generation place. In this example, text information B11 includes words "A city, B prefecture." Thus, the event cluster creation unit 122 designates the "A city, B prefecture" as the event generation place.

The event cluster creation unit 122, if the event generation place and the creation place of a temporary event cluster are close, and the event generation period includes the creation time of the temporary event cluster, associates the social content with the temporary event cluster. This is because, when such conditions are satisfied, there is quite a high possibility that the social content and the temporary event cluster indicate the same event. In this example, the event cluster creation unit 122 associates the blog B1 with the temporary event clusters PH1 to PH3.

The event cluster creation unit 122, if the social content includes photo content, associates the social content with a temporary event cluster including the photo content. In this example, the event cluster creation unit 122 associates the blog B1 with the temporary event clusters PH1 and PH3.

The event cluster creation unit 122 creates an event cluster by gathering content that are associated with each other. In this example, the temporary event clusters PH1 to PH3, the short blogs SB1 to SB4, and the blog B1 are associated with each other. Thus, the event cluster creation unit 122 creates an event cluster by gathering such content. The event cluster creation unit 122 stores the thus created event cluster into the storage unit 13.

In step S50, the meta information appending unit 123 acquires the event cluster from the storage unit 13, and creates meta information related to the event on the basis of the event cluster. In this example, the meta information appending unit 123 performs a process described below.

Further, the meta information appending unit 123, by performing morphological analysis on social content including text information, namely, the short blogs SB1 to SB4 and the blog B1, extracts words from the text information. Then, the meta information appending unit 123, if the extracted words include candidate words for an event title, designates a word with the highest priority among the words as the event title. In this example, as the text information B11 includes a facility name: "natural park," the meta information appending unit 123 designates the "natural park" as the event title. Then, the meta information appending unit 123 appends the event title information about the event title to the event cluster.

The meta information appending unit 123, if the extracted words include a word related to a period, designates the period as the event generation period. In this example, as the text information B11 includes a word "Mar. 10, 2011" indicating a period, the meta information appending unit 1213 designates "Mar. 10, 2011" as the event generation period. The meta information appending unit 123 appends the event generation period information about the event generation period as the meta information to the event cluster.

In addition, the meta information appending unit 123, if the extracted words include a word related to a place, designates the place as the event generation place. In this example, as the text information B11 includes a word "A city, B prefecture" indicating a period, the meta information appending unit 123 designates the "A city, B prefecture" as the event generation place. The meta information appending unit 123 appends the event generation place information about the event generation place as the meta information to the event cluster.

In addition, the meta information appending unit 123, if the same person is included in a predetermined number of or more pieces of photo content, designates the photo content including the person as the event representative content. In this example, all of the photo content PH1 to PH3 include the person A11. Thus, the meta information appending unit 123 determines the photo content PH1 to PH3 as event representative content. Then, the meta information appending unit 123 appends the event representative content information that specifies the event representative content as the meta information to the event cluster.

In addition, the meta information appending unit 123, if the same person is included in a predetermined number of or more pieces of photo content, designates the person as a main character of the event. In this example, all of the photo content PH1 to PH3 include the person A11. Thus, the meta information appending unit 123 determines the person A11 as a main character of the event. The meta information appending unit 122 appends the event main-character information about the main character of the event as the meta information to the event cluster.

In addition, the meta information appending unit 123, on the basis of the temporary event cluster, the social content, the event title information, the event generation period information, the event generation place information, and the event main-character information, generates event attribute information representing the event attributes. The meta information appending unit 123 appends the event attribute information as the meta information to the event cluster.

In this example, the event generation period is less than or equal to one day, the event generation place is outside of home, and the social content includes a word "natural park" representing a "landmark name." Thus, the meta information appending unit 123 appends event attribute information indicating "recreation" as the meta information to the event cluster.

After that, the user A requests the event automatic creation server 10 to display an event cluster using the user terminal 40 (or the user terminal 50). The event cluster creation unit 122, when requested by the user terminal 40 of the user A to display an event cluster, acquires an event cluster created for the user A from the storage unit 13. The event cluster creation unit 122 outputs the event cluster to the communication unit 11. The communication unit 11 outputs the event cluster to the user terminal 40 of the user A.

The communication unit 401 of the user terminal 40 receives the event cluster and outputs the event cluster to the control unit 405. The control unit 405, on the basis of the event cluster, displays an event cluster list image G-1 shown in FIGS. 10 to 12, for example.

The event cluster list image G-1 is divided into a meta information display area G1, an event representative content display area G2, a blog display area G3, a communication display area G4, and a link display area G5.

In the meta information display area G1, a list of meta information appended to the event cluster is displayed. In the example shown in FIG. 10, event title information, event generation period information, event attribute information, event generation place information, and event main-character information are displayed as the meta information. Needless to say, meta information displayed on the meta information display area G1 is not limited thereto.

In the event representative content display area G2, event representative content and a scene selection button G21 are displayed. In the example shown in FIG. 10, the photo content PH1 is displayed as the event representative content. When the user A presses (selects) the scene selection button G21, the event representative content in the event representative content display area G2 is switched. Note that in the event representative content display area G2, a temporary event cluster may also be displayed.

In the blog display area G3, a blog associated with the event representative content displayed in the event representative content display area G2 is displayed. In this example, the text information B11 associated with the photo content PH1 in the blog B2 generated by the user A is displayed.

In the communication display area G4, a short blog associated with the event representative content displayed in the event representative content display area G2 is displayed. In the example shown in FIG. 10, the short blogs SB1, SB3, and SB4 associated with the photo content PH1 are displayed. In addition, on a side of each short blog, an icon G41 representing the creator of the short blog is displayed. Note that in the communication display area G4, not only short blogs, but also various communication logs such as mails may be displayed. For example, when the event representative content is photo content of an after-party of a wedding, mails that have been exchanged among those concerned for preparation of the after-party may be displayed in the communication display area G4. The link display area G5 displays link information G51.

Figure 10:
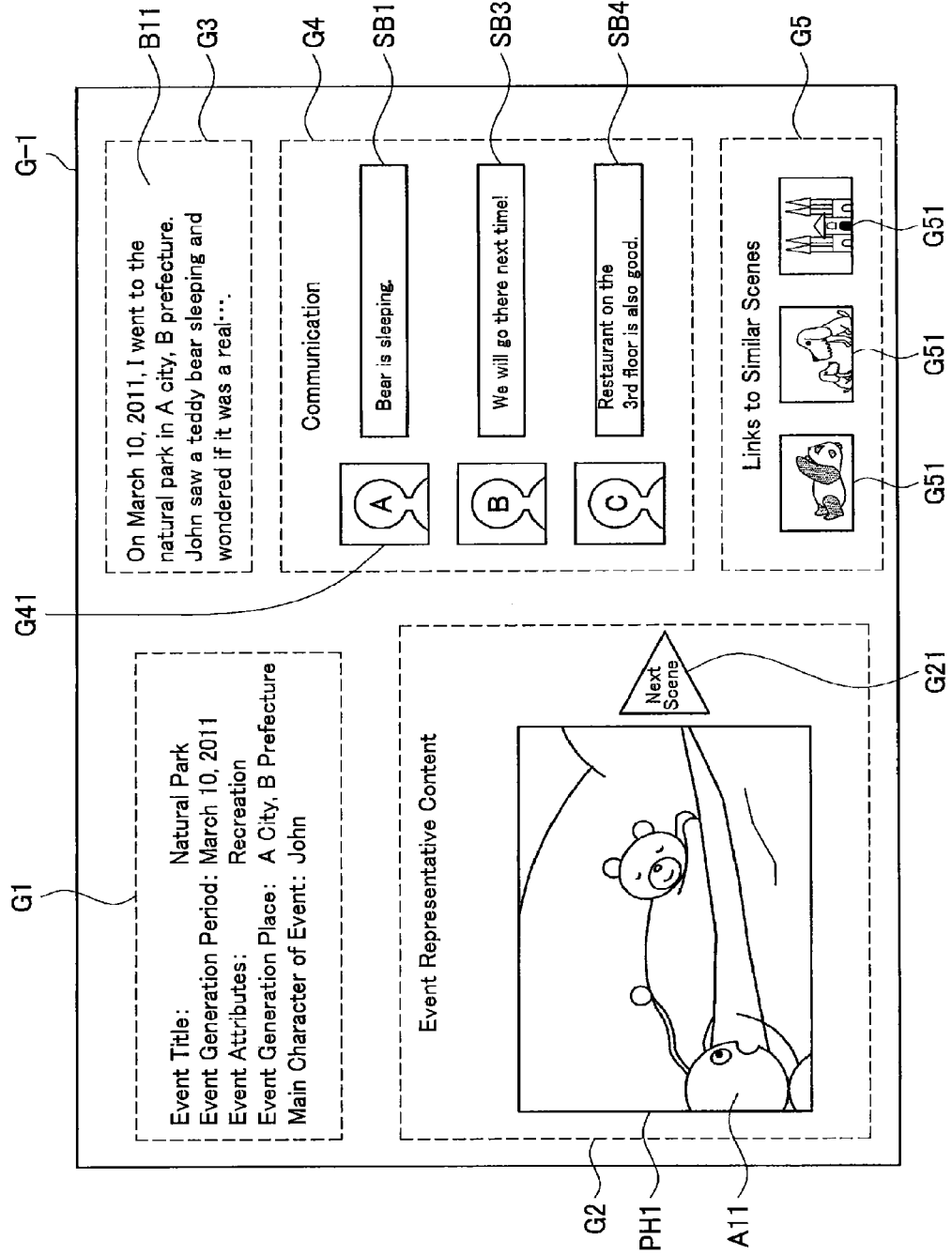
FIG. 10 is an explanatory diagram showing an example of an image displayed on a display of a user terminal.
Figure 11:
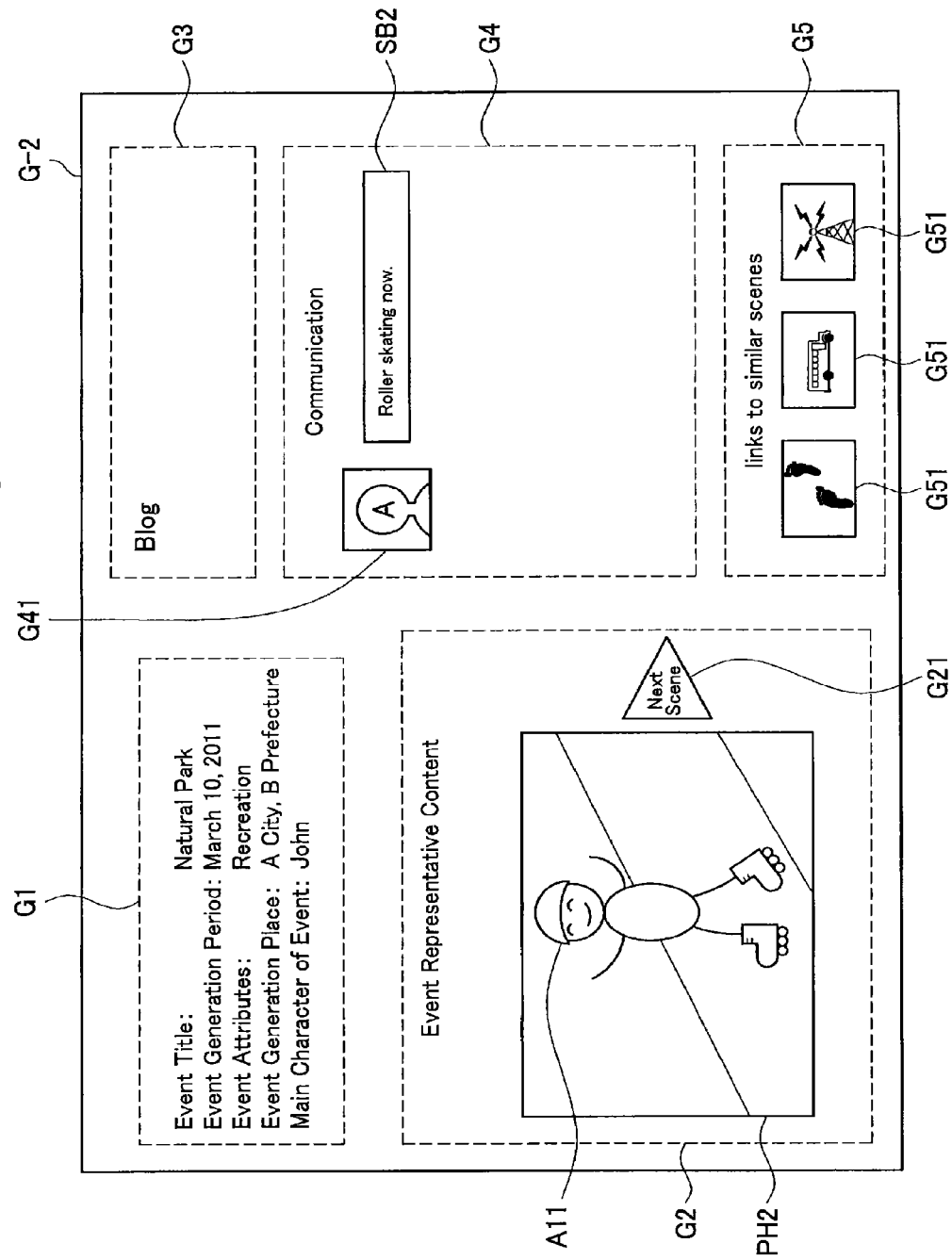
FIG. 11 is an explanatory diagram showing an example of an image displayed on a user terminal.

When the user A presses the scene selection button G21 shown in FIG. 10, an event cluster list image G-2 shown in FIG. 11 is displayed. In this example, the photo content PH2 is displayed in the event representative content display area G2 and the short blog SB2 is displayed in the communication display area G4.

Figure 12:
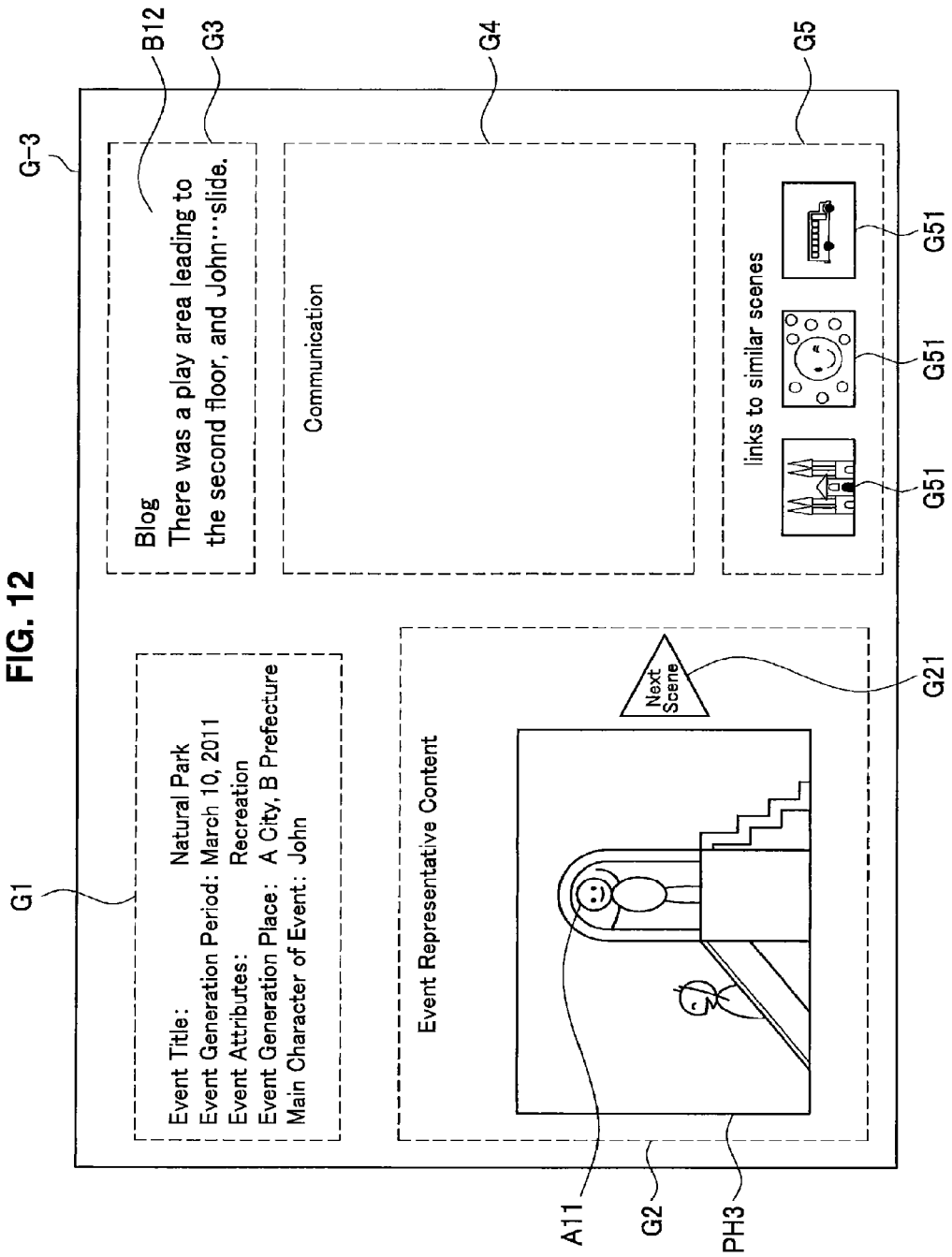
FIG. 12 is an explanatory diagram showing an example of an image displayed on a user terminal.

When the user A presses the scene selection button G21 shown in FIG. 11, an event cluster list image G-3 shown in FIG. 12 is displayed. In this example, the photo content PH3 is displayed in the event representative content display area G2, and the text information B12 in the blog B1 is displayed in the blog display area G3.

Note that the control unit 405 may, when a plurality of event clusters exist, display only an event cluster having the event attributes (e.g., "birthday") selected by the user A. In addition, the control unit 405 may cause social content (e.g., a user profile or an event calendar) other than the aforementioned social content to be included in the event cluster list images G-1 to G-3.

Accordingly, the information processing system 1 can create an event cluster including a plurality of types of content related to the same event and meta information related to the event, and provide the event cluster to a user. Accordingly, as the user can collectively check the plurality of types of content, he/she can easily recall the details of the event. Further, as the meta information is created on the basis of the event cluster, namely, the entire event, the user can promptly recall a summary of the event by checking such meta information.

Further, as the information processing system 1 can create an event cluster including photo content and social content, the user can easily recall the content of the photo content in detail by referring to the social content. For example, when social content describes a feeling a user had in creating photo content, the user can easily recall the feeling he/she had in creating the photo content.

Further, as the event cluster also includes social content created by a user other than the reference user, the user can easily recall a feeling of another user for photo content.

Further, the information processing system 1 can first create a temporary event cluster by gathering pieces of photo content whose creation places and creation times are close, and then create an event cluster including the temporary event cluster and social content. Thus, the information processing system 1 can promptly create an event cluster.

Further, the information processing system 1 can create event title information, event generation period information, event generation place information, event main-character information, and event attribute information, and append the created information as meta information to the event cluster. Thus, the user can promptly recall a summary of the event (e.g., an event name, a main character of the event, or event attributes) by referring to the meta information.

Further, the user terminals 40 and 50 can, by referring to the meta information, display only an event cluster having specific meta information. Accordingly, the user can check only a desired event cluster.

Further, the information processing system 1 can create event attribute information on the basis of not only photo content and social content but also event title information, event generation period information, event generation place information, and event main-character information. Thus, the information processing system 1 can determine event attributes in accordance with the actual circumstance of the event.

Further, as the user terminals 40 and 50 can display the event cluster list images G-1 to G-3 shown in FIGS. 10 to 12, the user can view photo content, social content, and meta information all at once.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

For example, although photo content is used as the reference content in the aforementioned embodiment, the present technology is not limited thereto. For example, social content such as a blog may be used as the reference content. In addition, an event cluster need not include photo content.

In addition, although the information processing system 1 collects pieces of photo content whose creation times and creation places are both similar into a temporary event cluster, the information processing system 1 may collect pieces of photo content whose creation times or creation places are similar.

Additionally, the present technology may also be configured as below (1)

An information processing device including an event cluster creation unit configured to create an event cluster including, among a plurality of types of content, reference content serving as a reference and related content, the related content having a different type from the reference content and indicating the same event as the reference content, and a meta information appending unit configured to create meta information about the event on the basis of the event cluster and append the meta information to the event cluster.

(2)

The information processing device according to (1), wherein the event cluster creation unit acquires photo content as the reference content, and acquires as the related content social content that is content other than the photo content among pieces of content provided by a social networking service.

(3)

The information processing device according to (2), wherein the event cluster creation unit creates a temporary event cluster including a plurality of pieces of the photo content, at least one of creation times or creation places of which are similar, and creates the event cluster including the temporary event cluster and the social content.

(4)

The information processing device according to (2) or (3), wherein the meta information appending unit, on the basis of at least one of the photo content or the social content, creates at least one of event title information indicating a title of the event, event generation period information indicating a period in which the event occurred, event generation place information indicating a place where the event occurred, event main-character information indicating a main character of the event, or event attribute information indicating an attribute of the event, and appends the created information as the meta information to the event cluster.

(5)

The information processing device according to (4), wherein the meta information appending unit creates the event attribute information on the basis of at least one of the event title information, the event generation period information, the event generation place information, or the event main-character information.

(6)

An information processing method comprising:

creating an event cluster including, among a plurality of types of content, reference content serving as a reference and related content, the related content having a different type from the reference content and indicating the same event as the reference content; and creating meta information about the event on the basis of the event cluster and appending the meta information to the event cluster.

(7)

A program for causing a computer to implement:

an event cluster creation function for creating an event cluster including, among a plurality of types of content, reference content serving as a reference and related content, the related content having a different type from the reference content and indicating the same event as the reference content; and a meta information appending function for creating meta information about the event on the basis of the event cluster and appending the meta information to the event cluster.

(8)

An information processing system comprising:

a server including an event cluster creation unit configured to create an event cluster including, among a plurality of types of content, reference content serving as a reference and related content, the related content having a different type from the reference content and indicating the same event as the reference content;

a meta information appending unit configured to create meta information about the event on the basis of the event cluster and append the meta information to the event cluster; and a communication unit configured to transmit the event cluster with the meta information appended thereto; and a user terminal configured to present the event cluster transmitted from the server to a user.

The invention claimed is:

1. An information processing device, comprising:
one or more processors configured to:
create an event cluster including photo content and social content of a social networking service, wherein each of the social content and the photo content are associated with a first event;

create meta information associated with the first event based on at least one of the photo content or the social content, wherein the meta information comprises event title information indicating a title of the first event, event generation period information indicating a period in which the first event occurred, event generation place information indicating a place where the first event occurred, event main-character information indicating a main character of the first event, or event attribute information indicating an attribute of the first event;

append the meta information to the event cluster to generate first information; and control transmission of the first information to a user terminal.

2. The information processing device of claim 1, wherein the one or more processors are further configured to acquire the photo content and the social content from a social networking service, wherein the social content has a type different from the photo content.

3. The information processing device according to claim 1, wherein the one or more processors are further configured to:

create a temporary event cluster including a plurality of pieces of the photo content, wherein at least one of the event generation period information or the event generation place information are similar; and create the event cluster including the temporary event cluster and the social content.

4. The information processing device according to claim 1, wherein the social content comprises at least one of an album, a blog, a micro-blog, a chat, a piece of mail, an event calendar, contact information, or a user profile.

5. The information processing device according to claim 1, wherein the information processing device is configured to store a face image correspondence table which comprises face images and information about people.

6. The information processing device according to claim 5, wherein the one or more processors are further configured to:

recognize a face image in the event cluster; and
identify a person based on the recognized face image and the face image correspondence table.

7. The information processing device according to claim 1, wherein the one or more processors are further configured to designate a person as the main character of the first event based on inclusion of the person in at least a determined number of pieces of the photo content.

8. The information processing device according to claim 1, wherein the one or more processors are further configured to designate a photo including a person as event representative content based on inclusion of the person in at least a determined number of pieces of the photo content.

9. The information processing device according to claim 1, wherein the one or more processors are further configured to extract words from text information in the social content.

10. The information processing device according to claim 9, wherein the one or more processors are further configured to designate a period as an event generation period based on the extracted words that include a word related to the period in which the first event occurred.

11. The information processing device according to claim 9, wherein the one or more processors are further configured to designate a place as an event generation place based on the extracted words that include a word related to the place where the first event occurred.

12. The information processing device according to claim 9, wherein the one or more processors are further configured to designate a candidate word with highest priority as the title of the first event based on the extracted words that include candidate words for the title of the first event.

13. An information processing method, comprising:
in an electronic device:
creating an event cluster including photo content and social content of a social networking service, wherein each of the social content and the photo content are associated with a first event;
creating meta information associated with the first event based on at least one of the photo content or the social content,
wherein the meta information comprises at least one of event title information indicating a title of the first event, event generation period information indicating a period in which the first event occurred, event generation place information indicating a place where the first event occurred, event main-character information indicating a main character of the first event, or event attribute information indicating an attribute of the first event;
appending the meta information to the event cluster to generate first information; and
controlling transmission of the first information to a user terminal.

14. The information processing method according to claim 13, further comprising storing a face image correspondence table which comprises face images and information about people.

15. The information processing method according to claim 14, further comprising:
recognizing a face image in the event cluster; and
identifying a person based on the recognized face image and the face image correspondence table.

16. The information processing method according to claim 13, further comprising designating a person as the main character of the first event based on inclusion of the person in at least a determined number of pieces of the photo content.

17. The information processing method according to claim 13, further comprising designating a photo including a person as event representative content based on inclusion of the person in at least determined number of pieces of the photo content.

18. The information processing method according to claim 13, further comprising
acquiring the photo content and the social content from a social networking service, wherein the social content has a type different from the photo content.

19. The information processing method according to claim 13, further comprising extracting words from text information in the social content.

20. A non-transitory computer-readable medium having stored thereon computer-executable instructions for causing a computer to execute operations, the operations comprising:
creating an event cluster including photo content and social content of a social networking service, wherein each of the social content and the photo content are associated with a first event;
creating meta information associated with the first event based on at least one of the photo content or the social content,
wherein the meta information comprises at least one of event title information indicating a title of the first event, event generation period information indicating a period in which the first event occurred, event generation place information indicating a place where the first event occurred, event main-character information indicating a main character of the first event, or event attribute information indicating an attribute of the first event;

appending the meta information to the event cluster to generate first information; and controlling transmission of the first information to a user terminal.

21. The non-transitory computer-readable medium according to claim 20, wherein the operations further comprising acquiring the photo content and the social content from a social networking service, wherein the social content has a type different from the photo content.

22. The non-transitory computer-readable medium according to claim 20, wherein the operations further comprising:

creating a temporary event cluster including a plurality of pieces of the photo content, wherein at least one of the event generation period information or the event generation place information are similar; and creating the event cluster including the temporary event cluster and the social content.

23. The non-transitory computer-readable medium according to claim 20, wherein the social content comprises at least one of an album, a blog, a micro-blog, a chat, a piece of mail, an event calendar, contact information, or a user profile.

24. The non-transitory computer-readable medium according to claim 20, wherein the operations further comprising storing a face image correspondence table which comprises face images and information about people.

25. The non-transitory computer-readable medium according to claim 24, wherein the operations further comprising:

recognizing a face image in the event cluster; and identifying a person based on the recognized face image and the face image correspondence table.

26. The non-transitory computer-readable medium according to claim 20, wherein the operations further comprising designating a person as the main character of the first event based on inclusion of the person in at least a number of pieces of the photo content.

27. The non-transitory computer-readable medium according to claim 20, wherein the operations further comprising designating a photo including a person as event representative content based on inclusion of the person in at least a number of pieces of the photo content.

28. The non-transitory computer-readable medium according to claim 20, wherein the operations further comprising extracting words from text information in the social content.

29. The non-transitory computer-readable medium according to claim 28, wherein the operations further comprising designating a period as an event generation period based on the extracted words that include a word related to the period in which the first event occurred.

30. The non-transitory computer-readable medium according to claim 28, wherein the operations further comprising designating a place as an event generation place based on the extracted words that include a word related to the place where the first event occurred.

31. The non-transitory computer-readable medium according to claim 28, wherein the operations further comprising designate a candidate word with highest priority as the title of the first event based on the extracted words that include candidate words for the title of the first event.

* * * * *